United States Patent [19]
Hunt et al.

[11] 3,868,104
[45] Feb. 25, 1975

[54] CONTACTLESS FLUID SEAL

[75] Inventors: Robert E. Hunt, Andover; John Delahanty, Boston; Bruce M. Lane, Bedford, all of Mass.

[73] Assignee: Arthur D. Little, Inc., Cambridge, Mass.

[22] Filed: July 26, 1973

[21] Appl. No.: 382,684

[52] U.S. Cl. ............. 277/30, 277/70, 277/DIG. 1
[51] Int. Cl. .................... F16k 41/00, F16j 15/14
[58] Field of Search ...... 277/30, 70, 71, 72, DIG. 1; 138/45

[56] References Cited
UNITED STATES PATENTS
2,509,699  5/1950  Sherrill ........................... 277/70 X
3,039,779  6/1962  Laird ................................ 277/30

Primary Examiner—Samuel B. Rothberg
Attorney, Agent, or Firm—Weingarten, Maxham & Schurgin

[57] ABSTRACT

A contactless fluid seal especially for use in a continuous electroplating system for preventing leakage of electolyte from a plating bath as a wire being plated is drawn through at least one wall of the bath. The fluid seal includes venturi means in the wall of the tank through which the wire is drawn and electrolyte or other fluid under pressure is directed into the inlet end of the venturi means and around the wire to prevent the flow of electrolyte from the tank. Mechanical contact between the wire and seal is not required as sealing is achieved on a non-contacting basis by the venturi action of the pressurized fluid.

9 Claims, 4 Drawing Figures

CONTACTLESS FLUID SEAL

FIELD OF THE INVENTION

The present invention relates to seals and more particularly to a fluid seal requiring no contact with a moving elongate member and adapted especially for use to continuous electroplating systems.

BACKGROUND OF THE INVENTION

In the continuous processing of wire, rod, or other elongate members, especially members having limited lateral flexibility, the member is drawn in a straight path through a processing bath by means of fluid seals in the inlet and outlet ends of the tank. Numerous problems are presented in providing efficient sealing between an elongate member moving through the tank and the tank seal by reason of pressure exerted by the liquid of the bath, the continuous motion of the elogate member, corrosive chemicals, and operational nature of various processing systems.

Sealing in such systems has generally been accomplished by means of various types of gaskets, packing or other types of friction seals which engage a member moving therethrough and which provide sealing action by occlusion of openings between the moving member and the packing of the seal in the tank wall. Such seals have often proved to be rather inefficient in many cases since an absolute seal between the relatively moving surface of the member and the tank cannot in practice be maintained by reason of surface irregularities of the moving member such as caused by surface imperfections or debris on such surface which can abrade the sealing material. In addition, other problems such as misalignment or spurious movement of the member through the seal can cause such seals to wear unevenly or rapidly and necessitate regular replacement of the gasket or packing material to maintain sealing efficiency. Chemical incompatibility of the plating solution with the sealing material can also affect the integrity of friction type seals and limit the materials which are usable therein.

In continuous plating systems, an arrangement of weirs is often provided over which a plating solution is pumped to produce a wave of solution through which the member being plated is moved. Such weir systems can be quite cumbersome in construction and there can be considerable difficulty in efficiently pumping solution over the weir especially where the plating liquid is in slurry form.

SUMMARY OF THE INVENTION

In accordance with the present invention, a contactless fluid seal is provided which is especially adapted for use in continuous electroplating systems wherein an elongate member such as a wire or rod is drawn through one or more walls of a plating tank and in which efficient sealing action is provided even in the presence of corrosive solutions, surface irregularities and irregular movement of the elongate member being plated. Briefly, the novel contactless seal of the present invention includes venturi means disposed in a wall of the plating tank and through which the elongate member is drawn, and means for directing a pressurized fluid, such as the plating solution, to the inlet aperture of the venturi and around the elongate member moving therethrough to provide venturi action for preventing leakage of electrolyte from the tank. The active nature of the novel seal permits adjustment of sealing performance to suit particular system requirements and such adjustment can be accomplished even during operation.

The novel seal is readily adaptable to continuous processing systems other than for electroplating and may be advantageously employed in various washing, etching, coating and other processing systems in which one or more seals are required for confinement of a fluid, either liquid or gas, in a vessel through a wall of which an elongate member is maintained or moved. The seal is operative whether or not the elongate member is moving or stationary and can be employed in any physical orientation.

DESCRIPTION OF THE DRAWINGS

The ivention will be more fully understood from the following detailed description taken in conjunction with the accompanying drawings, in which.

DETAILED DESCRIPTION OF THE INVENTION

Figure 1:
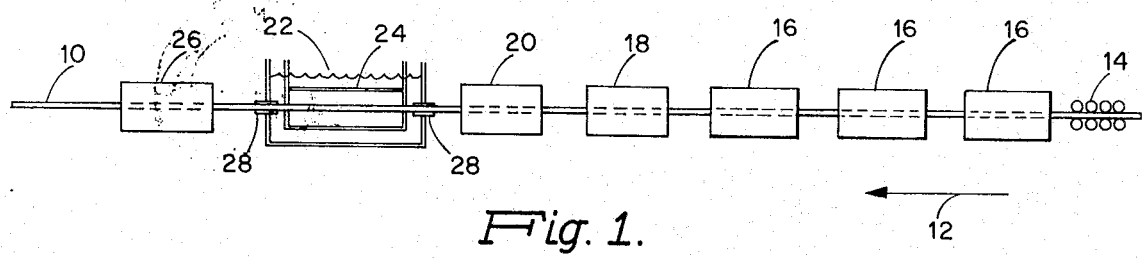
FIG. 1 is a diagrammatic representation of a continuous plating system in which the invention is especially useful.

The contactless fluid seal of the present ivention may advantageously be employed in processes for continuous electroplating of wire, rod, or other elongate members which are drawn through a plating tank. Typical apparatus for the continuous electroplating of wire is illustrated diagrammatically in FIG. 1, wherein a wire 10 is shown moving from right to left, as indicated by arrow 12, from a supply reel to a take-up reel (not shown). Wire 10 first passes through a straightening device 14, typically a plurality of confronting rollers between which the wire is moved, and thence through a series of cleaing baths 16 for removal of grease and other surface eontaminants. The wire is the pre-plated in a plating bath 18 with a suitable substrate coating which enhances the efficiency of subsequent plating. From the pre-plating bath, the wire is drawn into electrical contact apparatus 20. The wire is then drawn through a plating bath 22 which includes a submerged anode structure 24. After emerging from the plating bath 22, wire 10 passes through contact apparatus 26 which is identical to contact apparatus 20. Contact apparatus 20 and 26 functions as a cathode of the plating system and together with anode structure 24 is operative in well known manner to effect plating of a conductive material from the plating solution in bath 22 onto the surface of wire 10. After emerging from contact 26 the electroplated wire can be coiled on a take-up reel (not shown) or conveyed to subsequent treatment areas as the particular processing system may require. Seals 28 are provided at the inlet and outlet walls of plating bath 22, and are constructed and operative according to the invention to maintain the plating solution within the tank without leakage. Similar seals can also be provided in baths 16 and 18.

While the fluid seal of the invention will be described by way of example and for convenience in a continuous electroplating system, it will be understood that the novel seal has a wide range of applicability to other types of processing systems in which sealing means are required for maintaining a fluid in a tank or vessel in which an elongate member is disposed through a wall therein.

Figure 2:
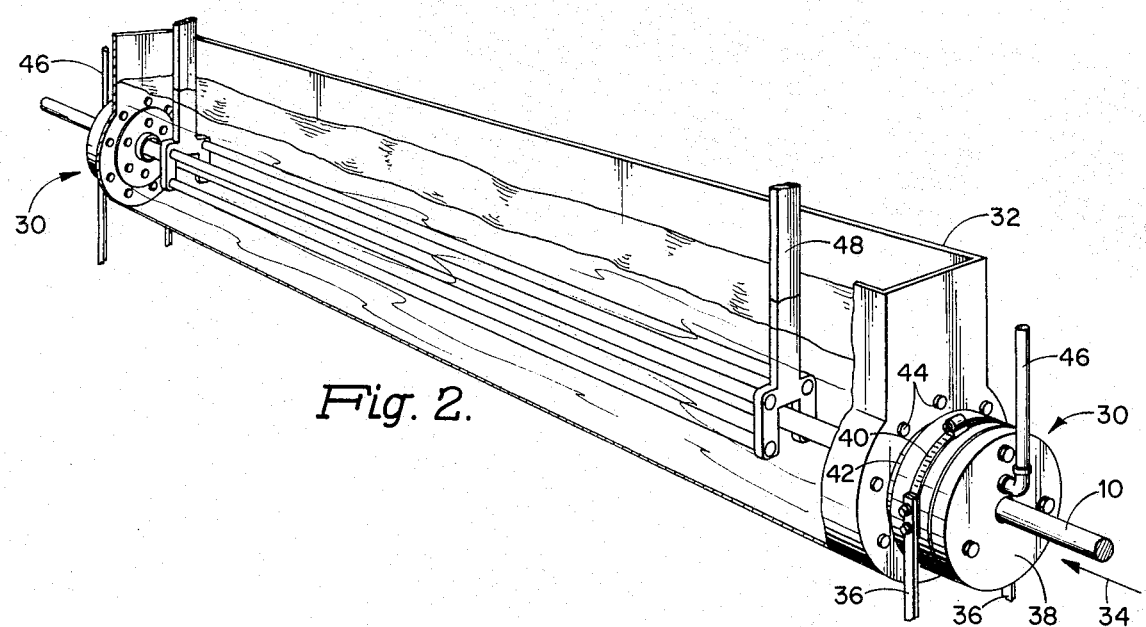
FIG. 2 is cutaway perspective view of a continuous plating tank employing novel seals of the present invention.

With reference now to FIG. 2, there is shown a preferred operative embodiment of a contactless fluid seal 30 attached to the respective inlet and outlet ends of an elongated tank 32, and through which an elongate member 10 is caused to move. Such movement is indicated in FIG. 2 to be from right to left as shown by arrow 34. Tank 32 may be vibrated or agitated in certain plating operations, and in such operations the seals 30 are maintained in fixed position and are resiliently coupled to the tank such that the seals remain stationary even though the tank is being agitated. In the illustrated embodiment, each seal 30 is supported by a pair of legs 36 attached to the seal housing 38 such as by a strap 40 disposed around the housing. Each housing is attached to a respective end wall of tank 32 by means of a flexible bellows or membrane 42 which is secured to the tank wall by a plurality of fasteners 44. Tank 32 is thus arranged to be agitated by suitable apparatus (not shown) while seals 30 remain stationary. A tube 46 is coupled to housing 38 for supplying fluid thereto to effect sealing operation, as will be described. An anode structure 48 is supported in the plating bath in surrounding spaced relation to wire 10 to serve as one system electrode. The cathode electrode is usually external to tank 32 and in contact with wire 10.

Figure 3:
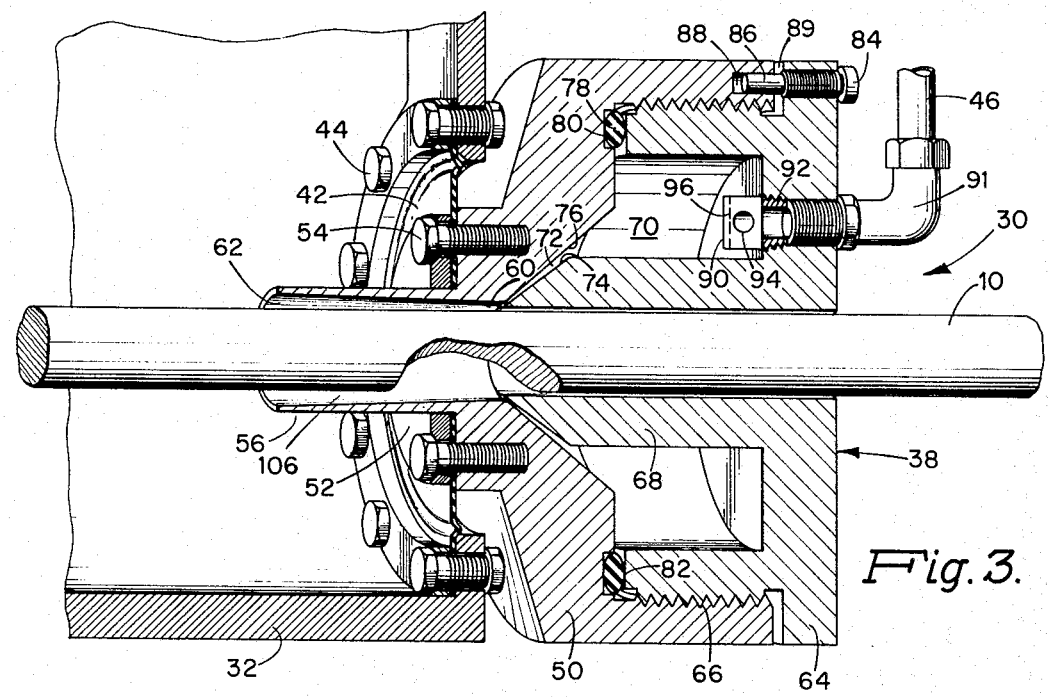
FIG. 3 is a partly cutaway pictorial view of a seal embodying the invention.

The seal 30 is shown more particularly in FIG. 3 and includes housing 38 having a generally cylindrical member 50 with an end of tapered configuration confronting tank 32 and affixed to flexible membrane 42 by a retaining ring 52 and fasteners 54. A venturi portion 56 is formed as part of member 50 and is maintained in position within tank 32. The venturi 56 includes a smaller diameter inlet end 60 which outwardly tapers to a larger outlet end 62 within the tank. A housing member 64 is threadably attached to housing member 50 by means of cooperative threads 66 provided on confronting circumferential surfaces thereof, and includes a central cylindrical portion 68 having an opening therethrough in alignment with the opening 60 of venturi 56 through which wire 10 is caused to move. An annular chamber 70 is provided within the housing defined by members 50 and 64, which chamber communicates with a conical nozzle passage 72 defined by confronting surface 74 of member 64 and surface 76 of member 50. The nozzle passage 72 terminates at the inlet end 60 of venturi 56. A resilient O-ring 78 is cooperatively arranged within an annular recess 80 in housing portion 50 and maintained in position by a confronting surface 82 of member 64 for sealing of the housing.

Adjustability of member 64 with respect to member 50 is provided by fastening means 66 for adjustment of the size of nozzle passage 72 and for positioning of the end portion of surface 74 in relation to venturi aperture 60. Machine screws 84, each having a pin end 86 for engaging any of a plurality of suitably sized position holes 88 disposed in circumferential arrangement in surface 89 of member 50, are provided for locking a selected axial position of member 64. A deflecting member 90 is provided in chamber 70 in fixed communication with passage 92 which, in turn, communicates with a threadably attached elbow fitting 91 connecting tube 46 to chamber 70.

The member 90 includes a right angle passage 94 therethrough for directing fluid from tube 46 into chamber 70 in a generally circumferential direction for the purpose of providing uniform flow around chamber 70 and into nozzle passage 72. Member 90 can include a beveled or tilted face 96 on the side opposite the orifice of passage 94 to reduce obstruction to the circumferential flow in chamber 70. Uniform flow can also be provided by other means such as a plurality of supply tubes coupled to chamber 70.

In operation, a fluid typically the plating solution in tank 32 is conveyed via tube 46 into chamber 70 and is maintained at sufficient pressure therein to cause a stream to issue from the nozzle passage 72 at the inlet end 60 of venturi 56 and to flow along passage 106 to the outlet end 62 of the venturi and thence into tank 32. The flow of fluid along the length of the venturi is selected to provide venturi action for the particular fluid and fluid employed. The tendency of the plating solution in tank 32 to flow out through the seal along the confronting surface of wire 10 is counteracted by the active hydraulic mechanism of the seal. The relative movement of wire 10 with respect to the seal is usually sufficiently slow with respect to the velocity of flow through the venturi to not materially affect venturi action, which is determined essentially by the pressure and flow of fluid through the venturi in relation to the dimensions thereof. It will be appreciated that the seal works equally as well with wire 10 or other member stationary within the seal or movable in a rotary as well as a longitudinal direction. In those instances where wire 10 is moved at a velocity significant in relation to the velocity of flow, such movement can be taken into account in determining the pressure and flow characteristics of the fluid applied to the seal to achieve intended venturi action.

Figure 4:
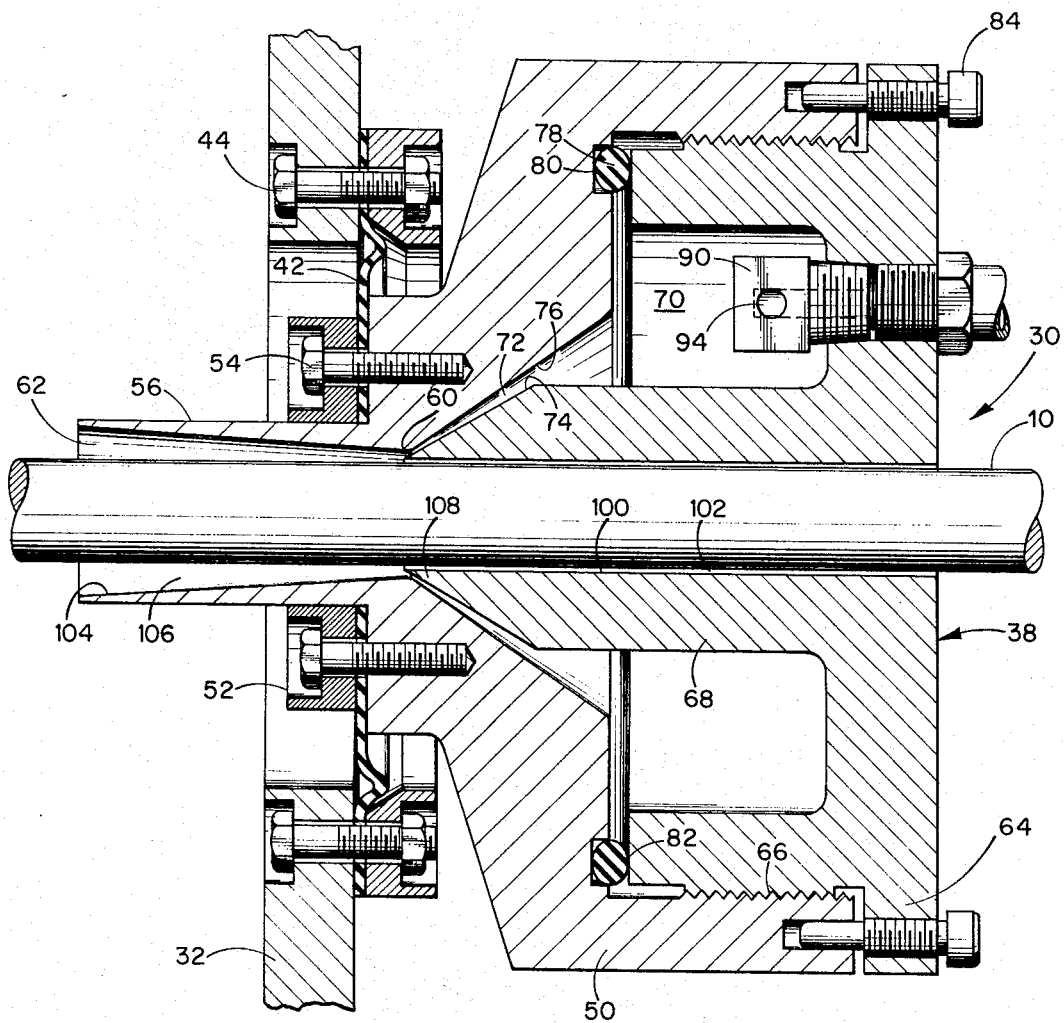
FIG. 4 is an enlarged cutaway sectional view of the embodiment of FIG. 3.

The fluid flow passages of the novel seal are shown more particularly in FIG. 4. It is seen that venturi 56 includes a tapered passage 106 defined by the confronting surface 104 of member 56 and the confronting surface of wire 10. The nozzle passage 72 terminates at or in the inlet aperture 60 of the venturi, passage 72 being tapered toward the inlet aperture to provide a well defined stream of fluid thereto. The position of the end portion 108 of member 64 confronting inlet aperture 60 is adjustable by rotation of member 64 with respect to member 50 to thereby adjust the gap dimension of nozzle passage 72 and the position of the nozzle aperture in relation to inlet aperture 60. In a typical implementation employed with a rod of 0.625 inch diameter, venturi 56 includes a passage therealong of about 2.3 inches, with an inlet aperture of approximately 0.06 inches and an outlet aperture of about 0.28 inches. A copper sulfate solution is supplied to chamber 70 via tube 46 at a pressure of 40 p.s.i.

In employing the plating solution as the fluid of the novel seal, the solution may undergo filtering, cooling or other pre-processing steps prior to application to chamber 70. As described above, the fluid employed in the seal can be other than that of the processing solution and can be of gas or liquid form. A substantial gap 102 is provided between the confronting surface of wire 10 and surface 100 of member 64 which permits wire 10 to move through the seal in a contactless manner thereby reducing wear and also permitting efficient sealing operation even in the presence of misalignment of wire 10 along its travel path through the seal and in the presence of any surface imperfections or debris on wire 10 as it moves through the seal. Since the sealing operation is achieved on an active basis by venturi action, the invention eliminates any requirement for physical contact between confronting moving surfaces to effect a seal.

Adjustment and operation of the seal of the present invention is not dependent on orientation, so that operation and adjustment of the active hydraulic mechanism of the seal may be accomplished in any orientation. The novel seal can, for example, be disposed on the bottom wall of a processing bath wherein an elongate member moves in a generally vertical plane through the bottom wall. The fluid seal may conveniently be formed from any material that is resistant to the fluid employed in the associated process or apparatus and which otherwise meets operational requirements. The seal can be of a plastic material such as high density polyethylene, or a metal such as titanium as examples. The seal can also be of a form to accommodate other than cylindrical elongate members, such as members of elliptical or other cross section.

While seals 30 in the embodiment of FIG. 2 may be of the same size for plating and other processing operations, it will be recognized that particular operations may require seals having different dimensions at the inlet and outlet ends to accommodate different overall diameters of the wire at the inlet and outlet ends. For example, for use in applying relatively thick plated coat, the seal 30 at the outlet end of tank 32 can be of larger bore to allow passage of the thicker plated wire therethrough.

While the novel seal of the present invention has been described in accordance with an illustrative embodiment, it is recognized that modifications and alternative implementations will occur to those skilled in the art, and it is intended that the appended claims cover all such variations.

What is claimed is:

1. A liquid seal for preventing liquid in a tank from flowing out of said tank wherein an elongate member is moved through at least one wall of said tank, without contact between said member and said wall and said seal structure, said liquid seal comprising:
    diverging venturi means adapted for mounting to a wall of said tank and having a larger end directly communicating with the inside of said tank and a smaller end for receiving a liquid and said elongate member for movement into said tank.
    means for applying a liquid under pressure to said venturi means;
    means for directing said liquid under pressure to said venturi means and including nozzle means coupled to the smaller end of said venturi means and through which said liquid under pressure is applied to said venturi means such that said liquid is caused to flow substantially in a direction from the smaller to the larger end of said venturi means and directly into said tank to provide venturi action and thereby prevent liquid from flowing along said elongate member out of said tank.

2. A liquid seal according to claim 1 including means for resiliently mounting said venturi means and said housing to the wall of said tank and operative to maintain said venturi means and said housing in stationary disposition even in the presence of vibration of said tank.

3. A liquid seal according to claim 1 wherein said liquid directing means includes means for adjusting the pressure and flow rate of said liquid applied to the smaller open end of said venturi means to provide intended venturi action.

4. A liquid seal according to claim 1 wherein said means for applying liquid under pressure includes:
    a first housing member adapted for mounting to said wall and adapted to support said venturi means;
    a second housing member cooperative with said first housing member, said first and second housing members defining a supply chamber therebetween in liquid communication with the larger end of said nozzle; and
    means for applying liquid under pressure to said supply chamber.

5. A liquid seal according to claim 4 further including deflection means in said supply chamber and operative to divert said pressurized liquid applied thereto to provide substantially uniform flow of said pressurized liquid through said nozzle means.

6. A fluid seal for preventing fluid in a tank from flowing out of said tank wherein an elongate member is disposed through at least one wall of said tank, said fluid seal comprising:
    a first housing member having:
        a surface adapted for mounting to said wall; and
        diverging venturi means extending from said mounting surface and having a flared tube terminating at a smaller end near said mounting surface and at a larger end directly communicating with the inside of said tank; and
        a first tapered surface converging to said smaller end of said venturi means;
    a second housing member cooperative with said first housing member and having:
        a central section including a tapered end surface cooperative with said first tapered surface to form a nozzle converging toward said smaller end of said venturi means;
        said central section having an opening therethrough in alignment with said flared tube for disposition of said elongate member;
    said first and second housing members defining a supply chamber therebetween in fluid communication with the larger end of said nozzle;
    fluid coupling means attached to said second housing member and communicative with said supply chamber for supplying pressurized fluid thereto; and
    means on said first and second housing members cooperative to move said second housing member with respect to said first housing member to adjust the orifice of said nozzle to vary the flow of pressurized fluid into said venturi means.

7. A fluid seal according to claim 6 wherein said means for moving said second housing member with respect to said first housing member include cooperating threads on said members and a resilient seal disposed between the relatively moveable portions of said members to maintain a sealed housing.

8. A fluid seal according to claim 6 further including a deflection means in said supply chamber and communicating with said fluid coupling means and operative to divert said pressurized fluid applied thereto to provide substantially uniform flow of said pressurized fluid through said nozzle.

9. A fluid seal according to claim 6 further including a plurality of circumferentially arranged position holes arranged in spaced circumferential rotation about the periphery of said first housing member; and
a plurality of pins mounted about the periphery of said second housing member and each engaging a respective one of said position holes, whereby said second housing member can be rotationally indexed with respect to said first housing member to adjust said nozzle orifice.

* * * * *